US011274602B2

(12) United States Patent
Olver et al.

(10) Patent No.: US 11,274,602 B2
(45) Date of Patent: Mar. 15, 2022

(54) AIR COOLER FOR GAS TURBINE ENGINE

(71) Applicant: PRATT & WHITNEY CANADA CORP., Longueuil (CA)

(72) Inventors: Bryan William Olver, Collingwood (CA); Daniel Alecu, Brampton (CA); Jason Fish, Oakville (CA); Zoran Markovic, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 360 days.

(21) Appl. No.: 16/421,760

(22) Filed: May 24, 2019

(65) Prior Publication Data

US 2020/0370476 A1 Nov. 26, 2020

(51) Int. Cl.
- *F02C 7/18* (2006.01)
- *F02K 3/06* (2006.01)

(52) U.S. Cl.
CPC ............... *F02C 7/18* (2013.01); *F02K 3/06* (2013.01); *F05D 2240/14* (2013.01); *F05D 2250/184* (2013.01); *F05D 2260/213* (2013.01)

(58) Field of Classification Search
CPC ...... F28D 1/047; F28D 1/0475; F28D 1/0477; F02C 7/14; F02C 7/18; F02C 7/185; F02C 7/047; F02K 3/06; F02K 3/115; F01D 5/187; F01D 25/02; F01K 19/04; F05D 2250/184; F05D 2260/20; F05D 2260/213; B64D 33/08; B64D 33/10; B64D 33/12
See application file for complete search history.

(56) References Cited

U.S. PATENT DOCUMENTS

| | | | |
|---|---|---|---|
| 2,646,971 A * | 7/1953 | Raskin | F28D 1/0477 165/134.1 |
| 6,035,627 A | 3/2000 | Liu | |
| 7,377,100 B2 | 5/2008 | Bruno et al. | |
| 7,784,528 B2 | 8/2010 | Ottow et al. | |
| 7,856,824 B2 | 12/2010 | Anderson | |
| 7,862,293 B2 | 1/2011 | Olver | |
| 8,141,337 B2 | 3/2012 | Porte et al. | |
| 8,250,852 B2 | 8/2012 | Porte et al. | |
| 8,266,888 B2 | 9/2012 | Liu | |
| 8,397,487 B2 | 3/2013 | Sennoun | |
| 9,200,855 B2 | 12/2015 | Kington | |

(Continued)

FOREIGN PATENT DOCUMENTS

| | | |
|---|---|---|
| AU | 2014333583 B2 | 7/2018 |
| CA | 2606278 C | 6/2016 |

(Continued)

*Primary Examiner* — Ehud Gartenberg
*Assistant Examiner* — Jacek Lisowski
(74) *Attorney, Agent, or Firm* — Norton Rose Fulbright Canada LLP

(57) ABSTRACT

A turbofan engine comprising an outer bypass duct, an annular bypass flow path between the outer bypass duct and a core engine, an engine component forming an airflow obstruction adjacent the outer bypass duct, an air cooler having a tube, the tube having at least a sinuous portion extending in the annular bypass flow path, the sinuous portion extending along the outer bypass duct, downstream of the airflow obstruction, the sinuous portion configured for exchanging heat between a fluid circulating in the tube and air circulating in the bypass flow path during operation of the turbofan engine.

13 Claims, 3 Drawing Sheets

(56) References Cited

U.S. PATENT DOCUMENTS

| | | | |
|---|---|---|---|
| 9,234,707 B2 | 1/2016 | Mackin et al. | |
| 9,239,005 B2 | 1/2016 | Strecker | |
| 9,764,435 B2 | 9/2017 | Morris et al. | |
| 9,777,963 B2 | 10/2017 | Martinez et al. | |
| 9,945,247 B2 | 4/2018 | Appukuttan et al. | |
| 10,006,369 B2 | 6/2018 | Kupiszewski | |
| 10,087,782 B2 | 10/2018 | Wang et al. | |
| 10,125,684 B2 | 11/2018 | Yu | |
| 10,184,400 B2 | 1/2019 | Cerny et al. | |
| 10,221,768 B2 | 3/2019 | Agg | |
| 10,240,536 B2 | 3/2019 | Bagnall et al. | |
| 10,809,016 B2 * | 10/2020 | Kironn | F28F 1/006 |
| 2013/0164115 A1 | 6/2013 | Sennoun | |
| 2015/0101334 A1 | 4/2015 | Bond et al. | |
| 2016/0169109 A1 | 6/2016 | Lui | |
| 2016/0215732 A1 | 7/2016 | Malecki | |
| 2016/0231068 A1 * | 8/2016 | Schmitz | F28F 9/0265 |
| 2016/0281532 A1 | 9/2016 | Rambo et al. | |
| 2017/0058772 A1 | 3/2017 | Frank et al. | |
| 2017/0198638 A1 | 7/2017 | Cerny et al. | |
| 2018/0003076 A1 | 1/2018 | Miller et al. | |
| 2018/0023475 A1 | 1/2018 | Xu | |
| 2018/0045116 A1 | 2/2018 | Schenk | |
| 2018/0058327 A1 | 3/2018 | Tajiri et al. | |
| 2018/0058472 A1 | 3/2018 | Tajiri et al. | |
| 2018/0066583 A1 | 3/2018 | Manheere et al. | |
| 2018/0149088 A1 | 5/2018 | Munsell et al. | |
| 2018/0171871 A1 | 6/2018 | Duong et al. | |
| 2020/0224974 A1 * | 7/2020 | Turney | F28D 7/082 |

FOREIGN PATENT DOCUMENTS

| | | |
|---|---|---|
| CN | 109026398 A | 12/2018 |
| CN | 105277023 B | 2/2019 |
| EP | 1939572 B1 | 5/2010 |
| EP | 2128023 B1 | 5/2012 |
| EP | 2795083 B1 | 7/2016 |
| EP | 2497908 B1 | 9/2016 |
| EP | 2966395 B1 | 5/2017 |
| EP | 3073217 B1 | 2/2019 |
| GB | 2519147 B | 9/2017 |
| GB | 2519153 B | 10/2017 |
| JP | 05305634 A | 11/1993 |
| JP | 06183976 A | 7/1994 |
| WO | 2018002855 A1 | 1/2018 |

* cited by examiner

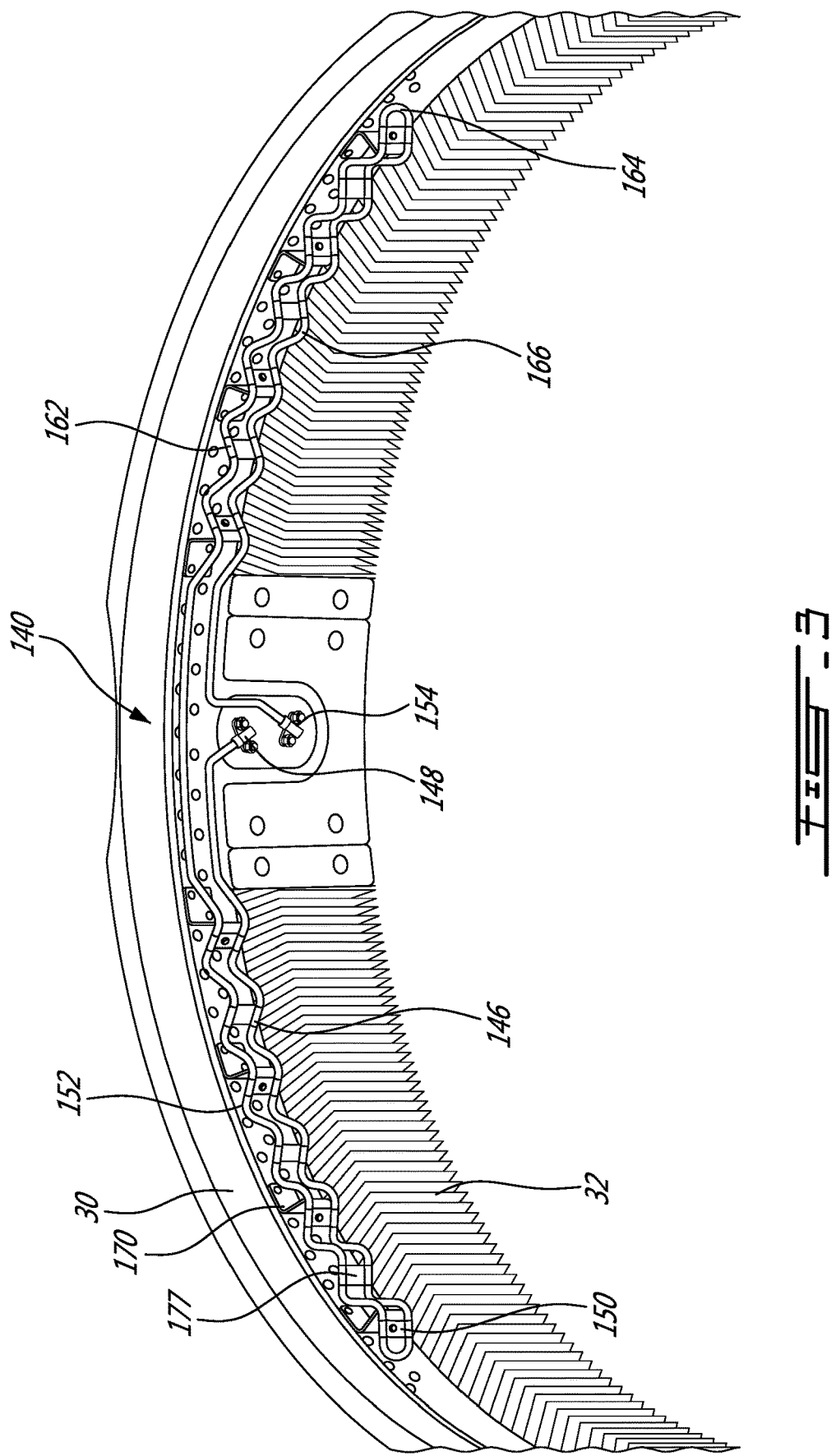

ial segment 52 can be seen to extend between the U 50 and the outlet 54.
In this example, the going segment 46 and the returning
AIR COOLER FOR GAS TURBINE ENGINE

TECHNICAL FIELD

The application related generally to gas turbine engines and, more particularly, to heat exchangers therefor.

BACKGROUND OF THE ART

In gas turbine engines, various functionalities can require cooling of a fluid. Cooling of a fluid is typically performed by a dedicated heat exchanger which has a given weight. It is always desired to reduce weight, when possible, in an aircraft. Some heat exchangers extracted air from a bypass flow path for use as the cooling media and directed the extracted air overboard, which affected the efficiency of the engine. There remained room for improvement.

SUMMARY

In one aspect, there is provided a turbofan engine comprising an outer bypass duct, an annular bypass flow path between the outer bypass duct and a core engine, an engine component forming an airflow obstruction adjacent the outer bypass duct, an air cooler having a tube, the tube having at least a sinuous portion extending in the annular bypass flow path, the sinuous portion extending along the outer bypass duct, downstream of the airflow obstruction, the sinuous portion configured for exchanging heat between a fluid circulating in the tube and air circulating in the bypass flow path during operation of the turbofan engine.

In another aspect, there is provided a method of cooling a fluid in a turbofan engine, the method comprising conveying the fluid in a sinuous tube positioned along an outer bypass duct and exposed to bypass air flow, and shielding the sinuous tube from foreign object damage.

In a further aspect, there is provided a heat exchanging element having a tube having an inlet and an outlet, the tube having a sinuous portion extending circumferentially around a main axis, and having a sequence of portions oriented in opposite radial orientations and connected to one another by a corresponding plurality of elbows, the sinuous portion being entirely contained within a given radial span.

DESCRIPTION OF THE DRAWINGS

Reference is now made to the accompanying figures in which:

FIG. 3 is an oblique view of a portion of an outer bypass duct having a surface cooler and a secondary air cooler, in accordance with an embodiment.

DETAILED DESCRIPTION

Figure 1:
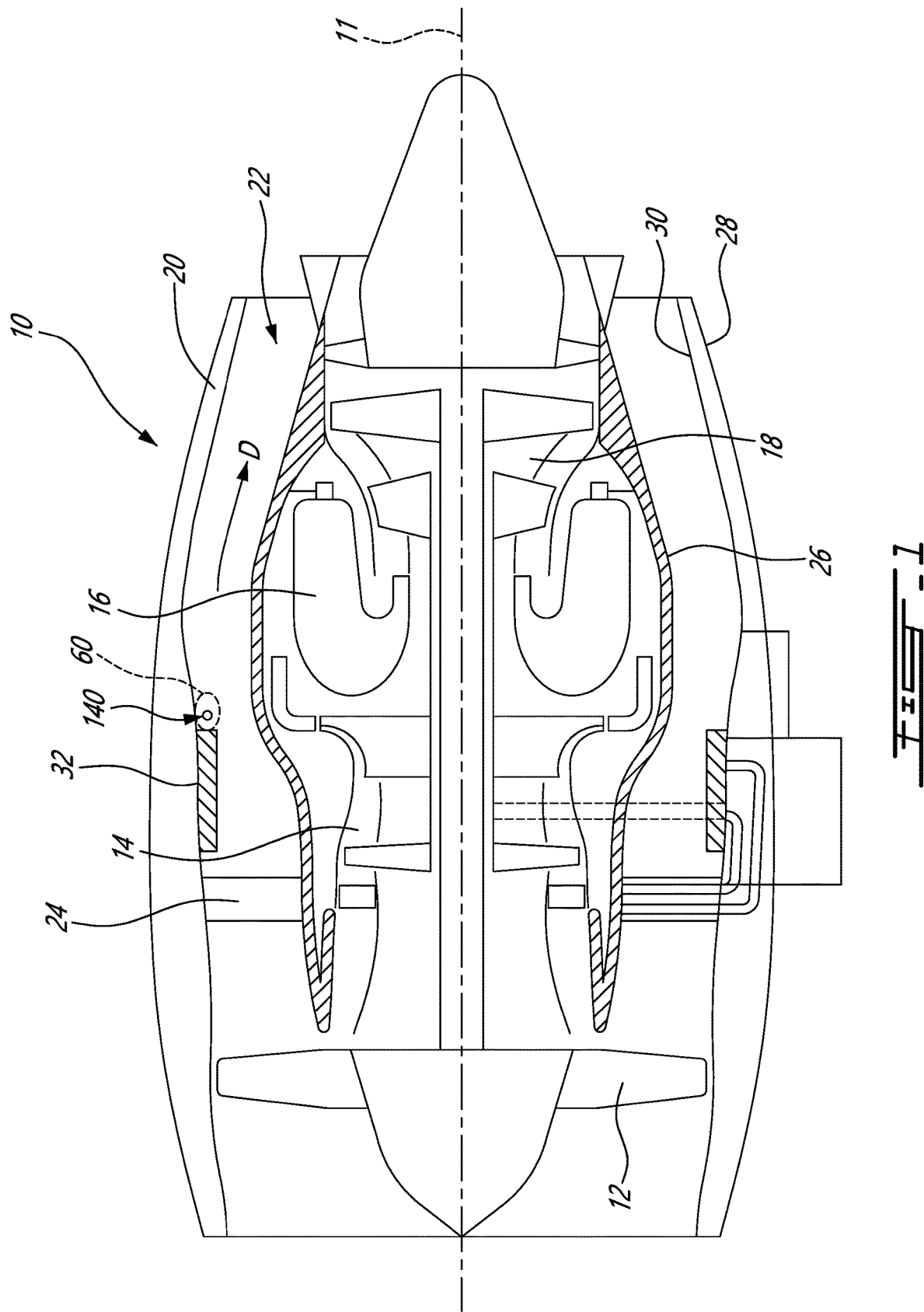
FIG. 1 is a schematic cross-sectional view of a gas turbine engine.

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan, compressor, and turbine sections have rotary components which rotate around an engine axis 11.

The gas turbine engine 10 further comprises a fan case defining a by-pass duct 22 surrounding the engine core that comprises the compressor 14, combustor 16, and turbine 18. A plurality of struts 24, which in some cases can be core links or vanes, are circumferentially disposed around the engine core and extend from a case of the engine core 26 toward the fan case. The struts 24 are disposed downstream of the fan 12 relative to a direction of the flow D. The struts 24, can be configured for structurally positioning the fan case wall forming the outer bypass duct 30, relative to the engine core case, including the wall forming the inner bypass duct. In a particular embodiment, the engine 10 also comprises a radially-outer nacelle wall 28.

In gas turbine engines, various functionalities can require cooling of a fluid. In some cases, the fluid is hotter than the temperature of the air in the bypass flow, and can thus be cooled by the air in the bypass duct 22. This can be the case, for instance, in the case of high pressure air obtained from the compressor section 14 and used to actuate an actuator, such as a Cowl Anti-Ice Valve actuation system for instance. One way to cool fluid using the bypass air is to circulate the fluid in a tube exposed to the bypass air, for instance. To a certain extent, smaller tubes can be favored over larger ones, as they can offer a better surface to volume ratio, and can offer better heat exchange power vs. weight, but smaller tubes can also be more fragile and weak against foreign object damage.

Figure 2:
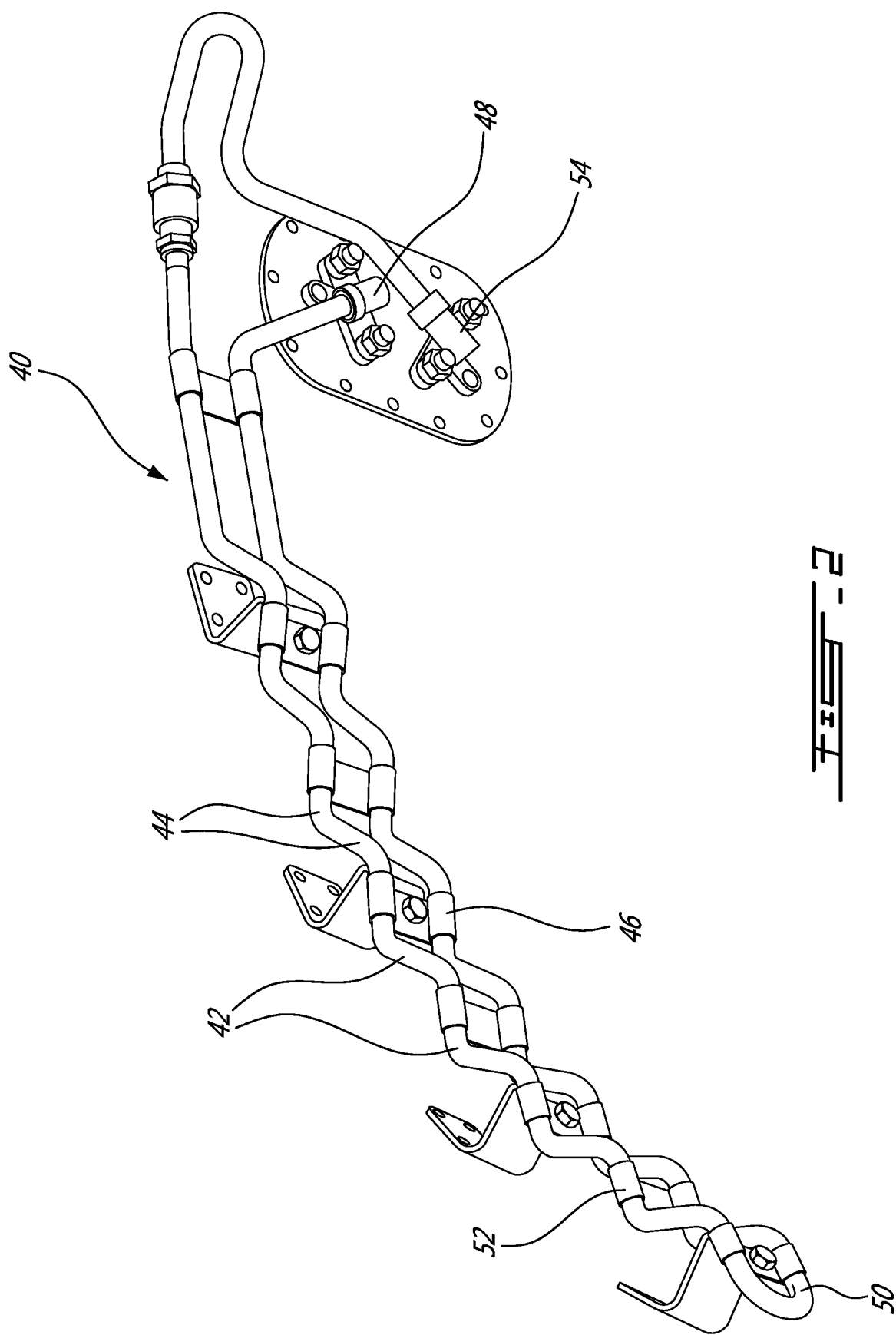
FIG. 2 is an oblique view of a heat exchange tube configured to extend along an outer bypass duct, in accordance with one embodiment.

An example of a tube 40 for use in cooling a fluid circulated therein using the bypass flow is illustrated in FIG. 2. It will be noted that the tube 40 can be configured for running along the surface of the outer bypass duct 30, and to this end, the tube can extend generally circumferentially, and therefore be curved in a transversal plane around the engine axis 11. It will be understood that to a certain extent, since heat transfer occurs progressively over time, for a given speed of fluid inside the tube 40, the longer the tube 40, the greater the amount of time the fluid will be exposed for heat transfer, and the greater the total heat transfer will be. However, it can be desired to limit the angular span of the tube for various reasons, such as to accommodate the tube 40 within a limited area such as for facilitating maintenance, for instance.

In this embodiment, the tube 40 has a sinuous portion which is wavy, or alternately said, has a zig-zag shape, including a plurality of segments 42 extending in alternating radial directions and interconnected by a corresponding plurality of elbows 44 or bends. The tube can be made of one single bended tube, or of a plurality of components, straight of bended, interconnected by connectors. It was found that providing a sinuous shape can allow to fit a greater length of tube in a smaller arc (angular span) of the circumference of the engine, and can potentially allow putting a greater length of tube in a limited area. Providing the tube 40 on the outer duct wall 30 rather than the inner duct wall could allow having a greater length of tube run circumferentially, because the greater circumference of the outer duct wall offers more potential length of tube for a given arc. Providing a tube 40 which has a going and a returning path leading from and to a same area, where adjacent inlet and outlet can be located, can also allow providing more tube length in a given arc. This latter configuration is used in the embodiment of FIG. 2 where a going segment 46 can be seen to extend from an inlet 48 to a "U" 50, and a returning segment 52 can be seen to extend between the U 50 and the outlet 54. In this example, the going segment 46 and the returning segment 52 extend parallel to one another and both have a sinuous portion. Moreover, the presence of elbows 44 or curves in the tube can cause internal flow disruption in the tube and increase heat transfer rate.

It will be understood that if a tube 40 is present in the bypass path, it can cause a flow disruption, and can be exposed to foreign object damage (FOD). A smaller cross-sectional area tube can be more fragile, and thus particularly susceptible to FOD. Configuring the tube in a manner to extend circumferentially closely along the outer bypass duct in a non-sinuous manner can reduce the radial span of the tube past the outer bypass duct and reduce the risk of FOD. However, using a tube which is sinuous in a transversal plane increases the radial span and can thus increase the exposure to FOD. To this end, it can be preferred to position the tube behind a component which causes an obstruction to the bypass flow.

In a particular embodiment shown in FIGS. 1 and 3, the gas turbine engine 10 further comprises a surface cooler 32 circumferentially extending on the fan case wall 30. In a particular embodiment, the surface cooler 32 is mounted to the fan case wall 30. The surface cooler 32 can have a plurality of axially and radially oriented fins configured to exchange heat with the bypass flow, and the fins can be circumferentially interspaced from one another. The surface cooler 32 forms a flow obstruction and a region of disrupted flow 60 (see FIG. 1), which can be non-laminar, can be present immediately downstream of the surface cooler 32. The surface cooler 32 can extend to a given radial depth into the bypass flow, along a dimension which can be referred to as its thickness. The surface cooler 32 can also have an axial length. It will be understood that in alternate embodiments, engine components other than a surface cooler 32 can form suitable flow obstructions for positioning a tube downstream thereof.

The region of disrupted flow 60 can have a limited axial span but can have occurrences of turbulence which can favour heat exchange. Accordingly, it can be desired to limit the axial span of the sinuous portion and to position it axially close, within the extent feasible/practical, to the engine component which forms a flow obstruction.

In the embodiment shown in FIG. 3, the flow obstruction caused by the surface cooler can be harnessed to protect a tube 140 from FOD. Indeed, in the embodiment shown in FIG. 2, a secondary air cooler is provided with a tube 140 which runs along the surface of the outer bypass duct wall 30, downstream of the surface cooler 32, and more specifically in the area of disrupted flow 60 immediately downstream of the surface cooler 32. As such, the effect of the tube 140 on the bypass flow is minimal, and the tube 140 is protected from foreign object damage by the surface cooler 32, which can be relatively sturdy.

In the specific embodiment shown in FIG. 3, the tube 140 has an inlet 148 leading to a going segment 146, then to a U 150, to a returning segment 152, to a second going segment 162, to a second U 164 and then to a second returning segment 166, and ultimately to an outlet 154 located adjacent the inlet 148. The first going segment 146 and first returning segment 152 are parallel to one another and each have a sinuous portion extending downstream of a first portion of the surface cooler 32, whereas the second going segment 162 and second returning segment 166 are parallel to one another and each have a sinuous portion extending downstream of a second portion of the surface cooler. Such a "two pass" flow path can cut the circumferential length in half, easing the field maintenance issues surrounding a complete tubular ring, and allowing replacement through the OBPD doors, for instance. Portions of the segments 152, 146, 162, 166 are not positioned behind a flow obstructing portion of the surface cooler 32. These latter portions can be non-sinuous and positioned adjacent the outer bypass duct wall 30 to limit their exposure to potential FOD. Alternate embodiments can have even more passes than two passes if found suitable.

The air cooler which includes the tube with the sinuous portion can be used for various reasons in alternate embodiments. In one particular embodiment, it was used to provide a means to cool engine P3 air in order to allow it to be used to power a Cowl Anti Ice Valve actuation system. Various coolers utilizing a separate heat exchanger can either be heavy or provide inefficiencies such as using/dumping fan bleed air overboard. Some of these inconveniences can be alleviated using a tube cooler in the bypass flow, in some embodiments.

The sinuous portion(s) 46 can be configured to favour heat exchange between the fluid conveyed in the fluid passage, and the compressed air which circulates in the annular flow path during operation of the gas turbine engine 10.

In the illustrated embodiment, the tube 140 is used to cool pressurized air, such as P3 air for instance, from the core engine 20, in a manner to reduce its temperature to make it suitable to operate a cowl anti ice actuation system. P3 air can be in the order of 1200° C., for instance, whereas it can be preferred to use pressurized air below 350° C. to cool this system. It was found suitable to achieve this using a heat exchanger, or more specifically a radiator, formed as presented above, i.e. with a sinuous portion of a fluid passage extending behind a flow obstruction in the bypass duct.

The zig-zag pattern can allow for additional "spring" in the system, reducing the stresses arising from the large differential in thermal growth of the tubes as the internal air is cooled. The zig-zag pattern also allows for portions of the tube to pass through bypass air with a higher velocity (away from the duct wall and cooler shadow) which increased the efficiency of the tubular cooler. The zig-zag pattern flow path can increase air-metal heat transfer inside the tube to an order of 20% in some cases.

The tube 140 in the bypass duct main stream can be held by a series of support brackets 170. The support brackets 170 can be configured to be very stiff in the plane of the main stream and thus resist axial deformation (which can limit flutter) but be significantly more flexible perpendicular to that plane, to allow circumferential deformation along the main direction of the pipe thermal expansion (and alleviate thermal tensions). At the same time, H-links structurally connecting the going segment to the returning segment can be used to support the pipe onto the brackets. This may increase torsional rigidity of a double pass line, and can be a secondary measure to avoid aerodynamic flutter or excessive deflection in the limited likelihood of FOD impact. The use of large bend radii at in the support brackets 170 can allow for a rigid, yet flexible attachment to accommodate thermal expansion of the tube In this specific embodiment, it was found practical to achieve this using a metal tube which is folded in a manner to be configured with a sequence of straight sections 60, interconnected to one another by corresponding elbows 62.

The choice of the diameter of the tube can be made taking into consideration two main factors. First, the flow rate of the fluid, as reducing or increasing the diameter of the tube can decrease or increase, respectively, the available flow rate. Second, the tube diameter affects the surface to volume ratio, and therefore smaller tubes can be preferred over larger tubes to favour heat exchange rate, which is affected by the surface to volume ratio. In this embodiment, it was preferred to use a tube having between ⅛" and ¼ in diameter, but this choice was made in view of the specific application, which will be presented below. A ¼ diameter tube having a 0.028" wall can be used in the embodiment depicted in FIG. 3, for instance.

The sinuous portion can be configured to favour heat exchange between the fluid conveyed in the fluid passage, and the compressed air which circulates in the annular flow path 19 during operation of the gas turbine engine 10.

The aerodynamic design of the flow obstruction can vary from one application to another. On one hand, a designer may wish to limit the amount of drag or turbulence caused by the presence of the flow obstruction in the bypass flow path, to increase the engine's efficiency. However, on the other hand, turbulence can be beneficial to heat exchange rate. A suitable trade-off can be selected by persons having ordinary skill in the art, in view of a specific application.

The above description is meant to be exemplary only, and one skilled in the art will recognize that changes may be made to the embodiments described without departing from the scope of the invention disclosed. For example, heat exchanger concepts presented herein can be used to cool fluids for various alternate uses, other than a cowl anti-ice actuation system. Bleed valve actuation is one example, but there are numerous possibilities. The fluid is not necessarily pressurized gas, and in some embodiments, it can be desired to circulate liquid, such as fuel or oil for instance, instead of pressurized gas, in the fluid passage, and the heat exchanger can even be used for heating instead of cooling in some embodiments. In an alternate embodiment, the tube can run along a surface of the inner bypass duct, or along a surface of the duct of the core path, upstream of the compressor section, for instance. The circumferential span of the sinuous portion can vary from one application to another. In some embodiments, the circumferential span corresponds to at least 2% of the entire circumference of the gas turbine engine bypass path. The circumferential span can be of at least 5%, can be of at least 10%, can be of at least 15%, or can be of at least 25%, depending on the embodiment, to name a few examples. The sinuous portion can have a varying number of waves depending on the embodiment. In one embodiment, the number of waves can be at least two. In other embodiments, the number of waves can be at least 4 or at least 6, to name two additional examples. Still other modifications which fall within the scope of the present invention will be apparent to those skilled in the art, in light of a review of this disclosure, and such modifications are intended to fall within the appended claims.

The invention claimed is:

1. A turbofan engine comprising
an outer bypass duct extending circumferentially around a central axis,
an annular bypass flow path between the outer bypass duct and a core engine,
an engine component forming an airflow obstruction inside the annular bypass flow path and adjacent an outer bypass duct wall, and
an air cooler having a tube, the tube having at least a sinuous portion extending in the annular bypass flow path, the sinuous portion extending along the outer bypass duct, downstream of the airflow obstruction, the sinuous portion configured for exchanging heat between a fluid circulating in the tube and air circulating in the annular bypass flow path during operation of the turbofan engine,
wherein the sinuous portion has a circumferential span of at least 2% of a circumference of the annular bypass flow path and wherein the sinuous portion has a sinuous shape in a transversal plane normal to the central axis.

2. The turbofan engine of claim 1 wherein the sinuous portion is positioned relative to the engine component in a manner to be shielded from foreign object damage by the engine component.

3. The turbofan engine of claim 1 wherein the sinuous portion has a sequence of straight portions oriented in opposite radial orientations and connected to one another by elbows.

4. The turbofan engine of claim 3 wherein the elbows are configured to generate mixing of the fluid circulating in the tube across a cross-section of the tube.

5. The turbofan engine of claim 1 wherein the sinuous portion is radially contained within an axial projection of a radial thickness of the engine component.

6. The turbofan engine of claim 1 wherein the engine component extends circumferentially along the outer bypass duct, forms a region of non-laminar flow immediately downstream of the engine component, the sinuous portion extending circumferentially in the region of non-laminar flow.

7. The turbofan engine of claim 6 wherein the engine component is a surface cooler having a plurality of radially extended and axially oriented fins circumferentially interspaced from one another.

8. The turbofan engine of claim 1 wherein the tube has an inlet leading to a going segment having the sinuous portion leading sequentially to a U, to a returning segment and to an outlet located adjacent the inlet.

9. The turbofan engine of claim 8 wherein the returning segment has a second sinuous portion.

10. The turbofan engine of claim 8 wherein the tube further has a second going segment directed circumferentially opposite to the first going segment, a second U and a second returning segment extending between the first returning segment and the outlet.

11. The turbofan engine of claim 10 wherein the returning segment, the second going segment, and the second returning segment also have a sinuous shape.

12. A method of cooling a fluid in a turbofan engine, the method comprising
conveying the fluid in a sinuous tube positioned along an outer bypass duct and exposed to bypass air flow, and shielding the sinuous tube from foreign object damage
wherein the fluid is guided along a first circumferential direction and then back in the opposite circumferential direction.

13. The method of claim 12 wherein the method comprises guiding the fluid across a plurality of elbows along the sinuous tube, thereby mixing the guided fluid across the cross section of the sinuous tube as it progresses along the length of the sinuous tube.

* * * * *